United States Patent
McArthur Jones et al.

(10) Patent No.: US 7,215,747 B2
(45) Date of Patent: May 8, 2007

(54) METHOD AND APPARATUS FOR PRODUCING INFORMATION REGARDING THE OPERATION OF A NETWORKED SYSTEM

(75) Inventors: Graham McArthur Jones, North Sydney (AU); James Douglas Woods, North Sydney (AU); Ankur Harish Kotwal, North Sydney (AU)

(73) Assignee: Integrated Research Limited, North Sydney (AU)

( * ) Notice: Subject to any disclaimer, the term of this patent is extended or adjusted under 35 U.S.C. 154(b) by 586 days.

(21) Appl. No.: 10/817,103

(22) Filed: Apr. 1, 2004

(65) Prior Publication Data

US 2004/0223600 A1 Nov. 11, 2004

(30) Foreign Application Priority Data

Apr. 4, 2003 (AU) ............................... 2003901611

(51) Int. Cl.
*H04M 15/00* (2006.01)

(52) U.S. Cl. .............................. 379/112.01; 379/32.01; 379/112.06; 379/133; 370/395.5; 370/410; 370/908

(58) Field of Classification Search .................... 379/9, 379/9.01, 32.01, 112.01, 112.06–112.08, 379/133–134, 137, 139; 370/351–353, 355, 370/395.5, 395.52, 395.53, 395.7, 401, 410, 370/908

See application file for complete search history.

(56) References Cited

U.S. PATENT DOCUMENTS

| 5,930,333 A | * | 7/1999 | Jabbarnezhad | ............... 379/14 |
| 2002/0194393 A1 | * | 12/2002 | Hrischuk et al. | ........... 709/318 |

* cited by examiner

*Primary Examiner*—Binh K. Tieu
(74) *Attorney, Agent, or Firm*—Timothy J. Keefer; Seyfarth Shaw LLP

(57) ABSTRACT

A method and apparatus for producing operational information regarding a networked system. System configuration information regarding the configuration of the system is obtained. Activity of the system is continuously monitored to obtain system activity information. The system configuration information is combined with the system activity information to obtain real time operational information.

38 Claims, 11 Drawing Sheets

METHOD AND APPARATUS FOR PRODUCING INFORMATION REGARDING THE OPERATION OF A NETWORKED SYSTEM

TECHNICAL FIELD

This invention relates to a method and apparatus for producing information regarding the operation of a networked system.

BACKGROUND TO THE INVENTION

In a networked system, such as a networked computer system or a communications system, various entities are connected to a network. Communication between the entities can be established across the network. If problems occur with the network, such as failure of network infrastructure equipment, or overloading of the network, then this can cause degradation or loss of communication between entities communicating across the network. This can be costly for businesses who rely on these networks for the conduct of their day to day business. It is important that such problems are avoided, or rectified as quickly as possible.

An illustrative example of the above described problem arises in the operation of an IP telephony system. In an IP telephony system, TCP/IP enabled telephones are connected to a network. The network utilised can be an existing LAN which is already used for other tasks, such as networking a group of computers. This means that a telephone system can be installed in a premises that has a pre-existing network, and the telephones are configured to operate over the existing network. This allows a telephone system to be installed requiring significantly less wiring than a traditional telephone system, which requires wiring to be installed for the sole purpose of connecting the telephones to a local telephone exchange such as a PABX.

In an IP telephony system, calls made between telephones connected to the same LAN are established as communication paths between the telephones across the LAN. These communications paths are established by a system controller which controls operation of the system. This controller is typically in the form of a file server computer connected to the network. If a call is required to be made to a telephone not connected to the LAN, then the communication path may be routed across a WAN, or may be made via a gateway which establishes a connection to a traditional telephone network, such as a Public Switched Telephone Network ("PSTN").

In a traditional telephone system, the originating telephone and the answering telephone remain connected by a permanent circuit for the duration of the call. The data transmission capability of the circuit is sufficient to carry a voice signal at an acceptable call quality. In contrast, during a telephone call in an IP telephony system, there exists no direct circuit connection between the originating and answering telephones. In the case of two telephones connected to the same network, the voice signal is encoded into data packets by one of the IP enabled telephones which are then transmitted across the network to the other telephone. The other telephone unencodes the received packets to reproduce the voice signal for the listener. This is a two way process to allow both call participants to speak and listen simultaneously.

In the case where the call is routed through a gateway to a PSTN, the data packets are transferred to or from the circuit switched PSTN by the gateway, which acts as an interface between the two systems.

The data packets, originating from either a gateway or an IP telephone, share the network with other data packets being sent and received by other entities connected to the network. These other entities can include other IP telephones, personal computers and other networked devices. During times of heavy network traffic, the packets sent and received by IP telephones may be held up due to bottlenecks caused by the overall level of network traffic. This can result in a depletion of the performance of the IP telephony system such as a drop in call quality experienced by the user, long delays in obtaining a dial tone, and even the dropping out of calls in progress. This disruption to the telephone service can be very costly in business. It is also frustrating to users who have come to expect trouble free telephone operation from traditional telephone systems.

Disruption to the system is similarly caused by delays in operation of the system controller. This could be due to various causes including a heavy demand on the controller, or that the controller has inadequate processing capacity to cope with normal demand.

Managing a networked system goes some way to avoiding, or assisting speedy resolution of, problems that occur with the system. These systems have been managed by reviewing activity logs created by entities connected to the network. However, these activity logs only give an indication of past operational activity and hence their usefulness in timely management of the network is limited.

SUMMARY OF THE INVENTION

In a first aspect the present invention provides a method of producing operational information regarding the operation of a networked system, the system including entities arranged to communicate over the network, the method including the steps of: obtaining system configuration information regarding the configuration of the system; continuously monitoring activity of the system to obtain system activity information; and combining the system configuration information with the system activity information to obtain real time operational information.

By this method, real-time information regarding the operation of the system is produced. This information can inform a system administrator of the current operational conditions of the system to allow them to take appropriate corrective action, if needed.

The system configuration information may include details of the topology of the system.

The system configuration information may be obtained from a controller of the networked system.

The system activity information may be obtained by monitoring network traffic.

The network traffic monitored may be that addressed to or from the controller.

The network traffic may be monitored at a node of the network which connects the controller to the network.

The method may further include the step of combining entity status information with the system configuration information and the system activity information.

The entity status information may be obtained by interrogating an entity connected to the network.

The address of the interrogated entity may be obtained from the system activity information.

The system may be a multi-media communications system.

The system activity information may include call signalling data.

The entities may include multi-media devices.

The entities may include IP telephones or gateways.

The operational information produced may include information regarding current calls.

The information regarding current calls may include quality of service.

The operational information produced may include information regarding current status of devices.

The operational information produced may include information regarding route availability.

The operational information produced may include the delay to obtaining a dial tone.

The method may further include the step of controlling the system based on the operational information.

In a second aspect the present invention provides an apparatus for producing operational information regarding the operation of a networked system, the system including entities arranged to communicate over the network, the apparatus including: obtaining means for obtaining system configuration information regarding the configuration of the system; monitoring means for continuously monitoring activity of the system to obtain system activity information; and combining means for combining the system configuration information with the system activity information to obtain real time operational information.

The system configuration information may include details of the topology of the system.

The apparatus may be arranged to obtain system configuration information from a controller of the networked system.

The monitoring means may be arranged to obtain system activity information by monitoring network traffic.

The network traffic monitored may be that addressed to or from the controller.

The monitoring means may be arranged to monitor network traffic at a node of the network which connects a controller of the networked system to the network.

The combining means may be further arranged to combine entity status information with the system configuration information and the system activity information.

The entity status information may be obtained by interrogating an entity connected to the network.

The address of the interrogated entity may be obtained from the system activity information.

The system may be a multi-media communications system.

The system activity information may include call signalling data.

The entities may include multi-media devices.

The entities may include IP telephones or gateways.

The operational information produced may include information regarding current calls.

The information regarding current calls may include quality of service.

The operational information produced may include information regarding current status of devices.

The operational information produced may include information regarding route availability.

The operational information produced may include the delay to obtaining a dial tone.

The apparatus may further include control means for controlling the system based on the operational information.

In a third aspect the present invention provides a computer program arranged to instruct a computing system to implement a method in accordance with the first aspect of the invention.

In a fourth aspect the present invention provides a computer program arranged to instruct a computer system to operate as an apparatus in accordance with the second aspect of the invention.

In a fifth aspect the present invention provides a computer readable medium providing a software program according to the third aspect of the invention.

In a sixth aspect the present invention provides a computer readable medium providing a software program according to the fourth aspect of the invention.

System configuration information includes information regarding the configuration of a system. This includes, but is not limited to, information about the topology of the system such as the identity of devices connected by the network and whether they are presently connected to the network, and how they are connected to the network and their addresses on the network. It also includes information about how the system should react to particular conditions, such as routing of traffic on the network.

System activity information includes information regarding activity of the system. This includes, but is not limited to, information derived from use of devices connected to the system that requires them to communicate by way of the network. This can include commands or instructions sent or received by entities, and data sent to or from entities.

Entity status information includes information regarding the status of entities connected to the network. This includes, but is not limited to, capabilities of an entity, and current operating conditions of an entity. Entity status information may be obtained by interrogating a particular entity and receiving a response.

BRIEF DESCRIPTION OF THE DRAWINGS

An embodiment of the present invention will now be described, by way of example only, with reference to the accompanying drawings, in which:

FIG. 4 is a list of call legs produced by an embodiment of the invention;

FIG. 6 is a list of devices produced by an embodiment of the present invention;

FIG. 8 is an overview of route availability produced by an embodiment of the present invention;

FIG. 9 is a list of endpoints for a gateway produced by an embodiment of the present invention.

DETAILED DESCRIPTION OF THE PREFERRED EMBODIMENT

Figure 1:
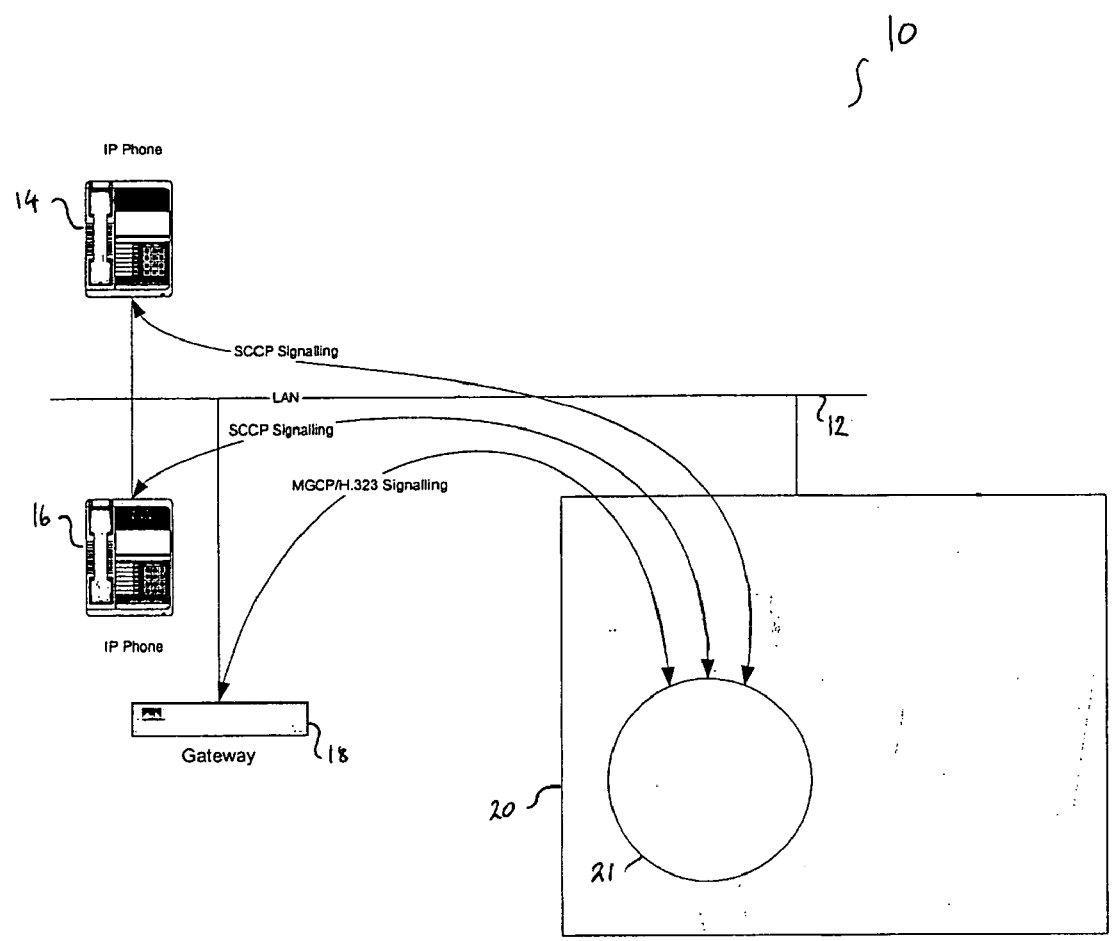
FIG. 1 is a schematic view of a known IP telephony system.

Referring to FIG. 1, a known IP telephony system is shown. The system includes a collection of entities connected to a network in the form of LAN 12. The entities include multi-media devices including IP telephones 14, 16 and gateway 18. The gateway could be either of an H.323 or MGCP gateway. The multi-media devices are the end points within the call system that actually perform the input/output operation on voice and video media.

The system further includes a controller in the form of system controller 20. System controller 20 is the central processing unit of IP telephony network 10. It is embodied as a network file server computer running suitably configured software. Depending upon the size of the system, a cluster of computers may be used. System controller 20 includes a data repository which holds system configuration information regarding IP telephony system 10. The system configuration information includes details of the topology of the network, and information that informs system controller 20 how to process telephone calls made by use of the system 10 by establishing connections between the multi media devices. It further includes details of whether a physical multi-media device has actually been installed to handle calls for a particular telephone extension number. Depending upon the size and geographical distribution of system 10 there may be more than one system controller 20.

Telephone calls are established via signalling that runs across LAN 12. For instance, if the receiver of IP telephone 14 is lifted then a signal is sent by IP telephone to system controller 20 indicating that the receiver has been lifted. System controller 20 operates to provide a dial tone to IP telephone 14 to indicate to the user that they may place a call. Digits pressed on IP phone 14 to dial a number are individually processed by system controller 20. The system configuration information includes routing information that instructs system controller 20 how to route a call, based on the digits dialled. If the user dials the number that identifies IP telephone 16 then system controller establishes communication between IP telephones 14 and 16. If the number dialled relates to a destination device not connected to the LAN 12, system controller 20 routes the call via gateway 18 which interfaces with another telephone system.

Figure 2:
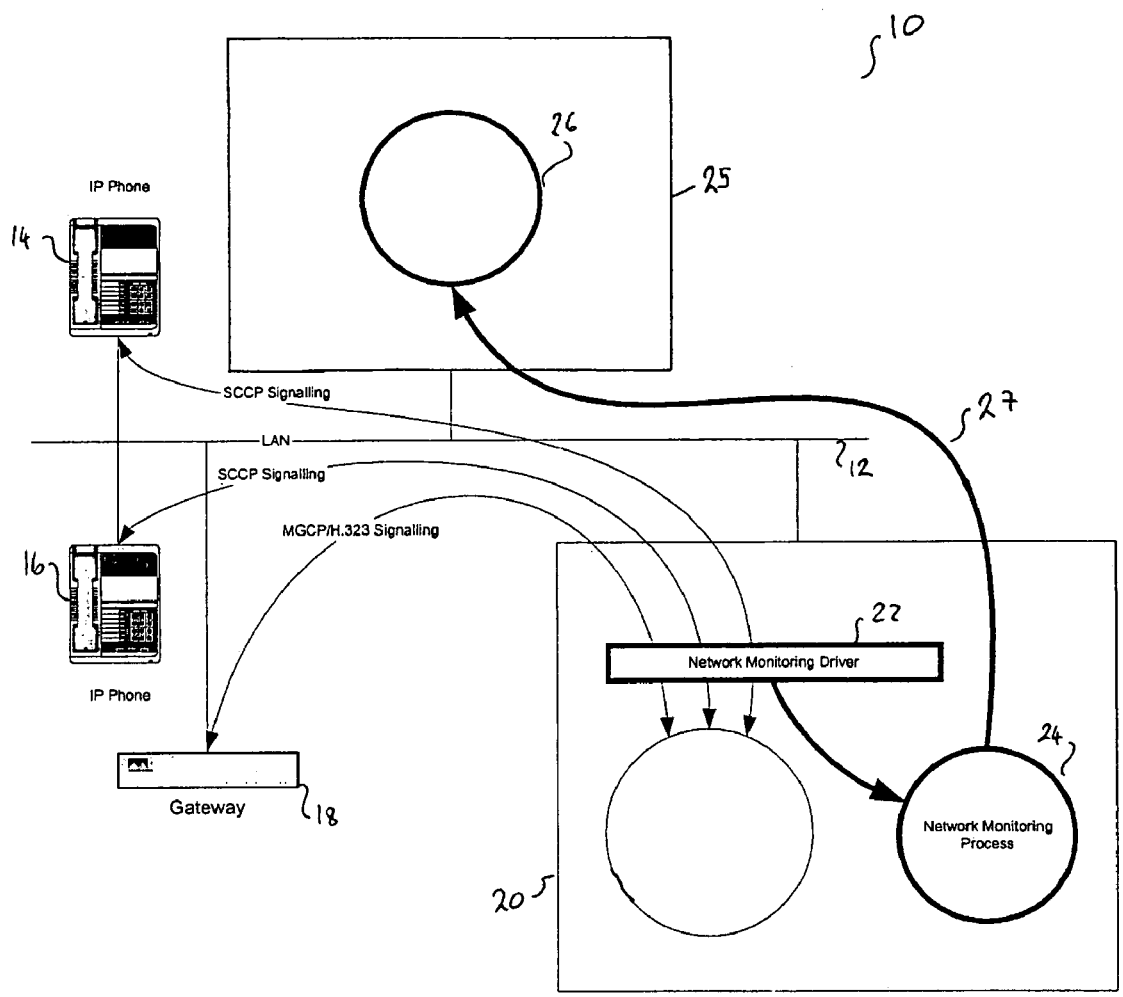
FIG. 2 is a schematic view of the IP telephony system of FIG. 1 modified to include an apparatus according to an embodiment of the present invention.

Referring to FIG. 2, the system of FIG. 1 is shown modified to include an apparatus in accordance with an embodiment of the invention. The apparatus includes obtaining means embodied in software program 26 that is arranged to obtain configuration information from the data repository of system controller 20. The apparatus further includes monitoring means in the form of a combination of Network Monitoring Driver (NMD) 22 and Network Monitoring Process (NMP) 24. NMD 22 runs on System controller 20 and intercepts each signalling packet that enters and exits the network node by which the controller 20 is attached to the network. NMP 24 filters the packets and synthesises system activity information 27 which includes call signalling data from multi-media devices such as IP phones and gateways. The system activity information is sent to file server computer 25 which is connected to LAN 12 and is running software program 26. Combining means is embodied in software 26 and operates to combine the configuration information with the system activity information in real time to produce operational information regarding operation of the system.

Figure 3:
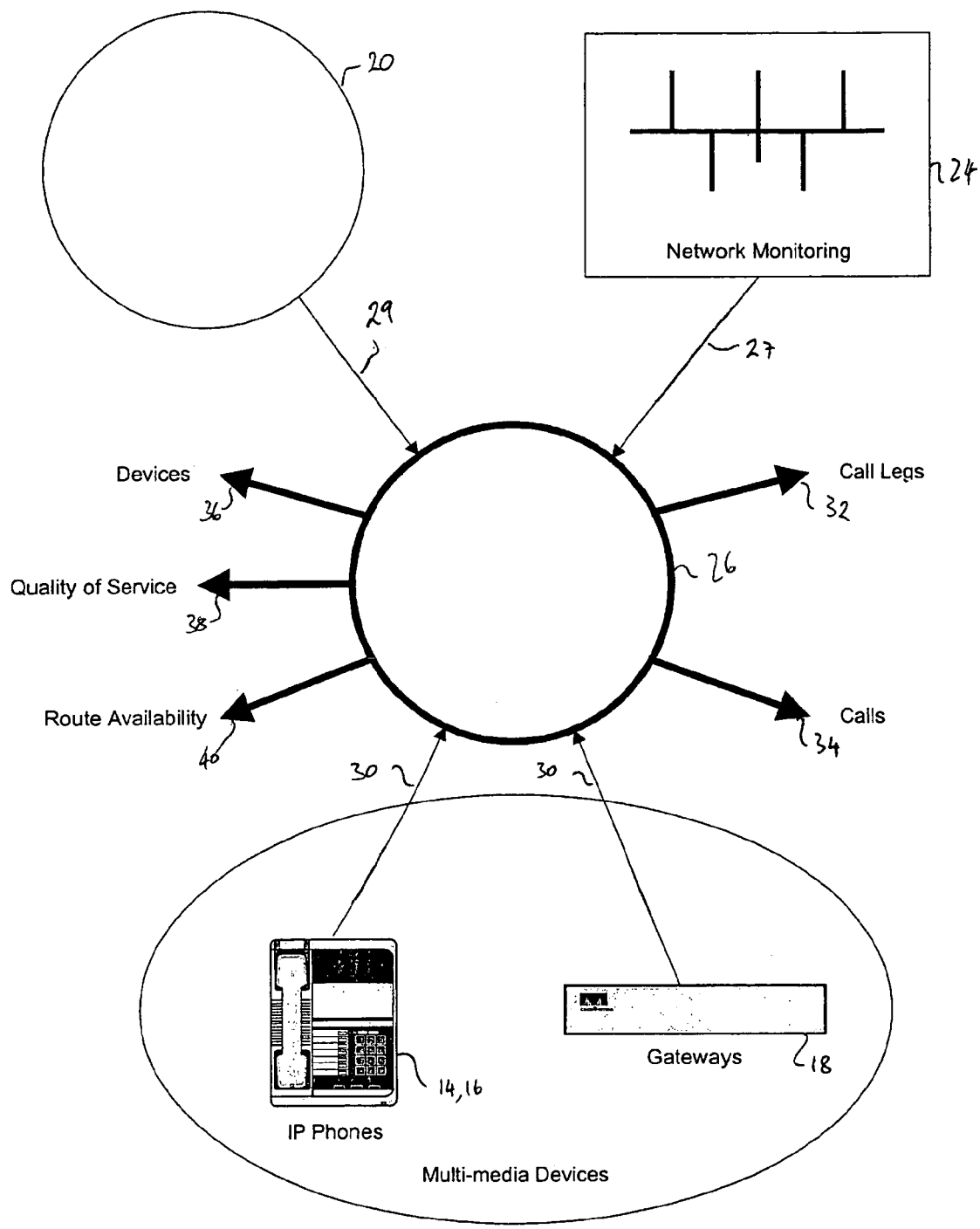
FIG. 3 is a schematic overview of a method according to an embodiment of the invention.

Referring to FIG. 3, an overview of the operation of the software program 26 is shown. Software program 26 obtains system configuration information 29 from the data repository of system controller 20. The system configuration information 29 is obtained upon initialisation of the software program 26. The system configuration information 29 remains constant during operation of system 10 until the configuration of system 10 is altered such as by the addition or removal of multi-media devices. Updated system configuration information is obtained by software program 26 to allow for changes in the configuration of system 10.

Software program 26 further obtains system activity information 27 from network monitoring process 24. The system activity information 27 reflects activity in system 10 and is sent to the software program 26 whenever activity occurs. The system configuration information 29 and the system activity information 27 are combined by the software program 26 to obtain operational information, which can be made available to a user or system administrator.

Software program 26 also receives entity status information by interrogating multi media devices in the form of IP telephones 14, 16 and gateway 18. The system configuration information 29 and the system activity information 27 are used to determine the address of the device to interrogate.

System Activity Information

There are three main groups of system activity information 27 obtained by the network monitoring process 24:
  Signalling Path Information
  Media Path Information
  Multi-media Device Status Information Signalling Path Information Whenever a call attempt is made from a device a signalling connection in some sense is created between the device and the relevant system controller 20. The NMP detects any new call attempts and creates a call leg object to represent the lifetime of the call from the originating end. Similarly whenever a device answers a call a signalling connection is created between it and the system controller 20 and the NMP creates a call leg object to represent the lifetime of the call from the answering end.

IP phones and gateways use several different signalling standards (otherwise known as protocols) to communicate with the system controller 20. IP phones use the SCCP protocol and gateways use the MGCP and H.323 protocols. The NMP parses these protocols and from them obtains the following call leg information:
  Device Name (protocol dependant)
  Device IP Address
  Call Reference Number
  Calling Party Number
  Called Party Number Media Path Information From the device signalling the following information is obtained about the media path:
  Voice Compression Standard
  RTP IP addresses and ports This information is stored in the call leg object that was created for the call attempt.

Multi-media Device Status Information

From the device signalling the following information is obtained about the status of the multi-media device:
  Registration Failure Cause
  Off-Hook Count
  On-Hook Count
  Delay-To-Dial-Tone Entity Status Information The multi media devices connected to LAN 12 contain entity status information 30 that can be obtained by interrogating the particular device, and receiving a response from the device. Examples of Multi-media Device data sources are:

HTML Pages from IP phones
    SNMP MIB accesses from gateways

The entity status information 30 that can be obtained from direct interrogation of multi-media devices includes:

List of interfaces
    Interface types (FXO, FXS, E&M, PRI, CAS)
    Interface status (Up/Down)
    Voice Compression Standards
    Quality of Service Parameters
    Software version Operational Information Software program 26 combines the system configuration information 29 and the system activity information 27 and may further combine the entity status information 30 to produce operational information including information pertaining to call legs 32, calls 34, devices 36, quality of service 38 and route availability 40 as will now be described.

Call Legs

Figure 4:
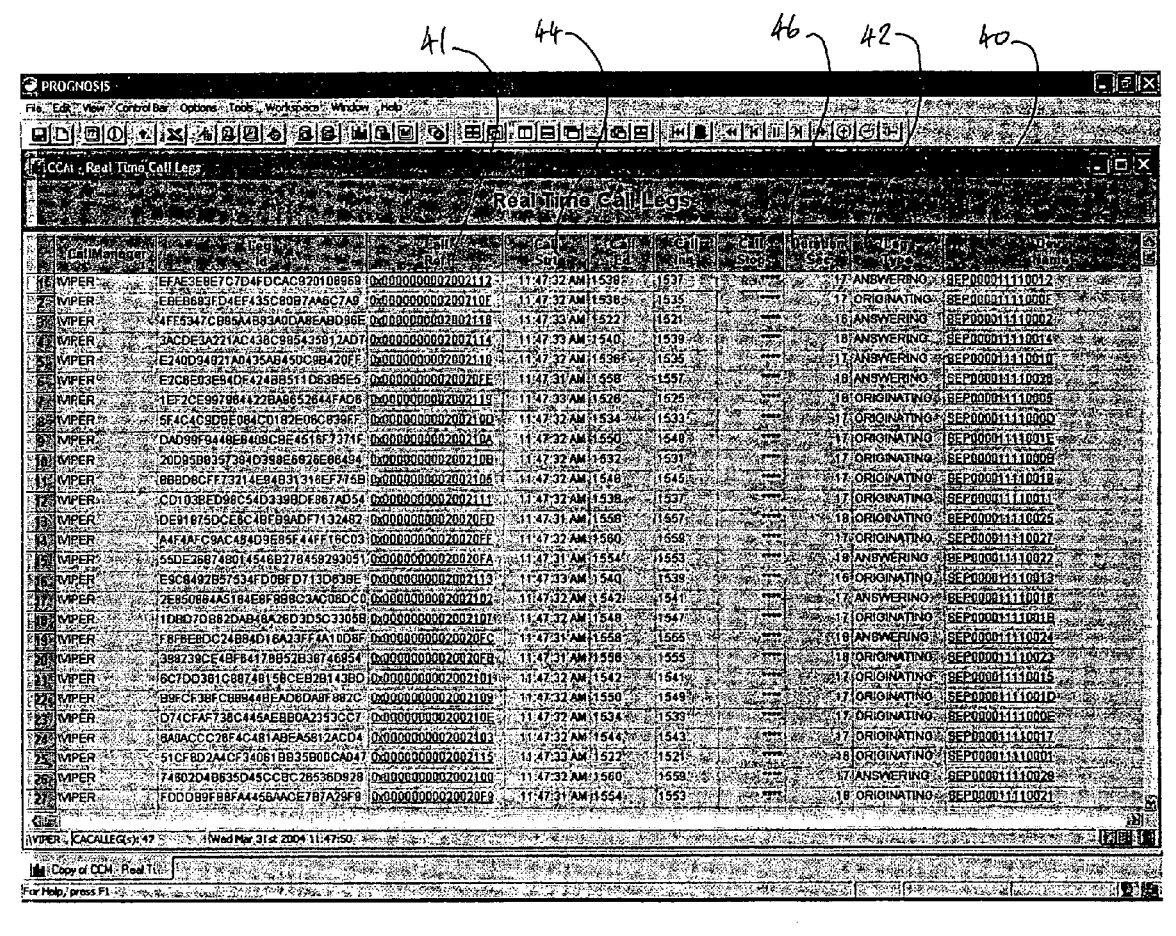

The call leg objects created by the NMP are matched to the device that created the call leg by directly indexing off the device name or comparing the IP address that the call leg was sourced from to the IP addresses of the devices according to the system configuration information 29. Referring to FIG. 4, the operational information produced includes:

Device Name 40
    Device IP Address
    Device RTP IP Address
    Device RTP UDP Port
    Destination RP IP Address
    Destination RTP UDP Port
    Call Reference 41
    Called Party Number
    Calling Party Number
    Call Type 42 (Answering/Originating)
    Call Start Time 44
    Call Duration 46
    Voice Compression Standard
    Protocol Type (SCCP/MGCP/H.323)

Calls

Figure 5:
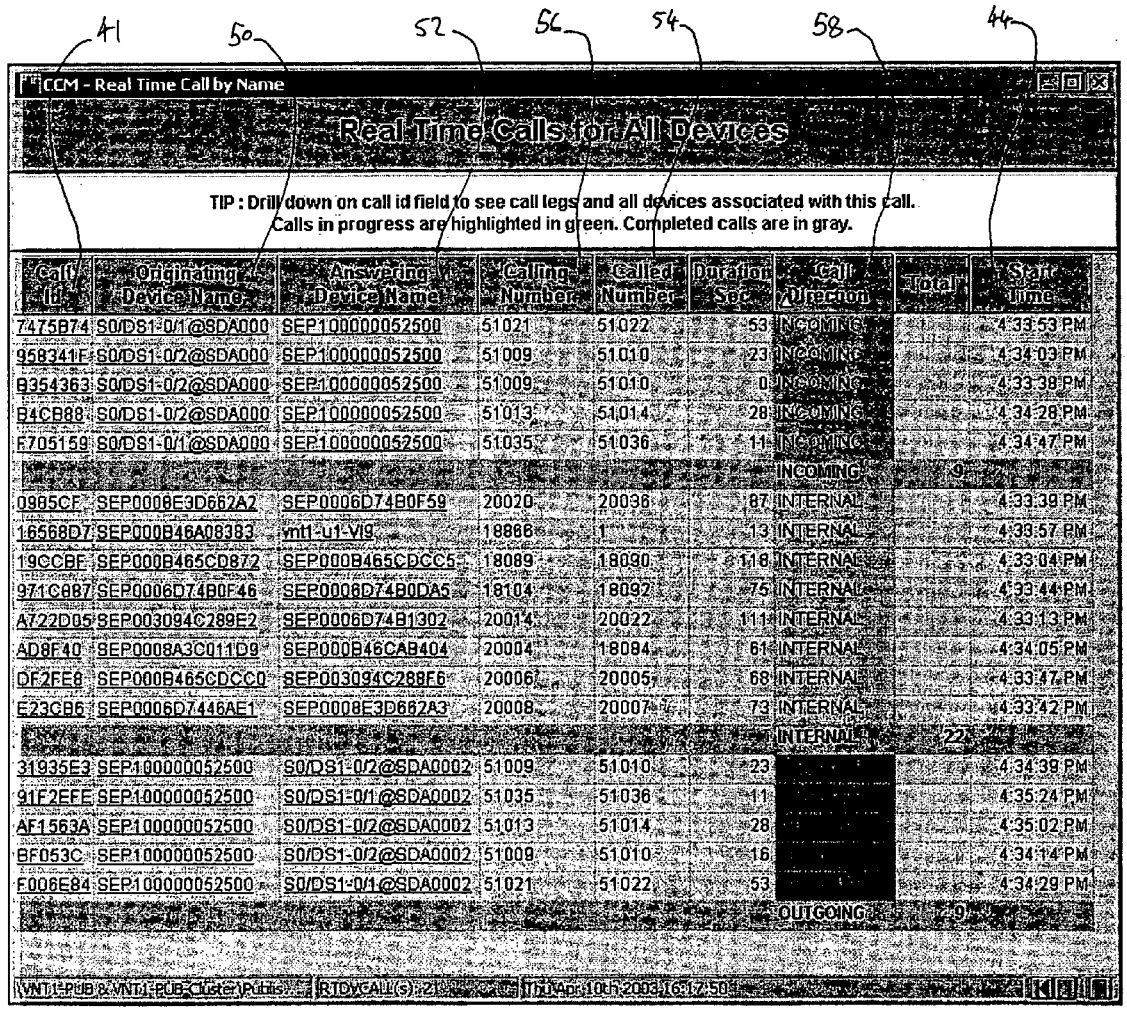
FIG. 5 is a list of real time calls produced by an embodiment of the present invention.

A call is said to exist when two call legs with matching RTP IP addresses and ports are identified, indicating that two multi-media devices have exchanged information that allows them to transport voice and/or video information to each other. It is possible to obtain information on all of the calls present within the packet switched network at any given time and on any given multi-media device. Referring to FIG. 5, the information produced includes:

Call Reference 41
    Originating Device Name 50
    Answering Device Name 52
    Called Party Number 56
    Calling Party Number
    Call Start Time 44
    Call Stop Time
    Call Direction 58 (Incoming/Outgoing/Internal/Trunked)

Devices

In order to render the information about current calls meaningful a list of multi-media devices that can be called is required. By combining the system configuration information 29 obtained from the system controller 20 with the entity status information 30 obtained from interrogating the devices and the system activity information 27 the following device information can be provided:

Device Name 40
    Device Type
    Protocol Type
    IP Address
    Device Description
    Slot Number
    Subunit Number
    Port Number
    Channel Number (only relevant for bearer channels within PRI and CAS spans)
    Status (Up/Down)
    Voice Interface Card Name
    Delay-to-dial-tone Quality of Service Quality of Service parameters and Voice Compression Standard figures for a particular call in progress are obtained by interrogating the multi-media devices involved in the call. These devices are identified by the information produced in relation to calls as described above. Quality of service is calculated to ITU G-107 or P.862 standards.

Figure 6:
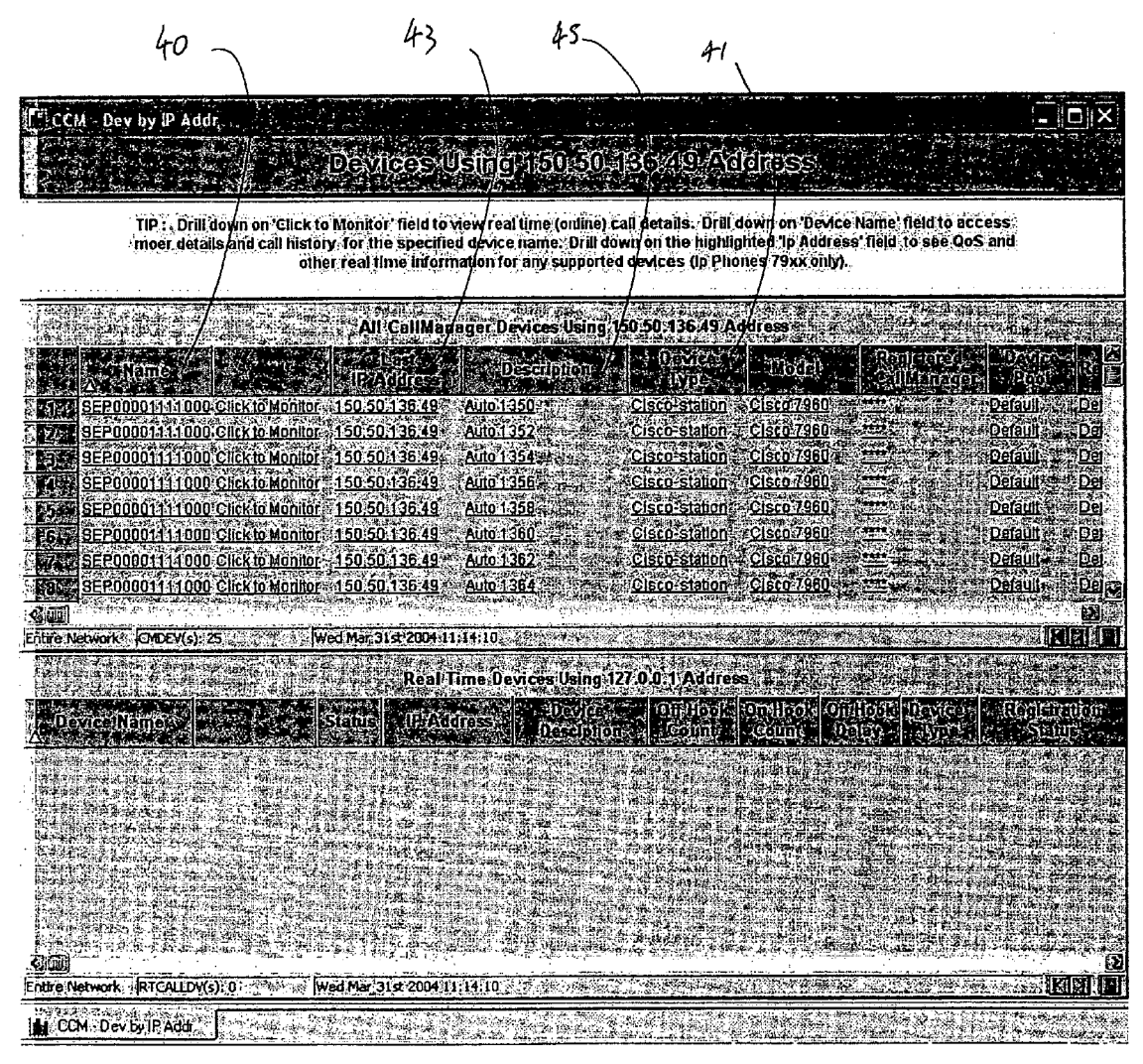

In certain instances, a monitoring device may be employed to monitor the quality of service experienced by a particular multi-media device. In this case, the monitoring device may be interrogated to determine information relating to quality of service. Referring to FIG. 6, real time quality of service information is illustrated for a particular IP telephone. The quality of service parameters include jitter and lost packets.

Route Availability

It is highly desirable to determine the availability of service within the packet switched network. This is most effectively done by calculating the availability for various patterns of phone numbers, otherwise known as route patterns. High availability means that nearly all of the devices assigned to route calls matching that pattern are operational; low availability means that few of the devices assigned to route calls matching that pattern are operational.

Figure 7:
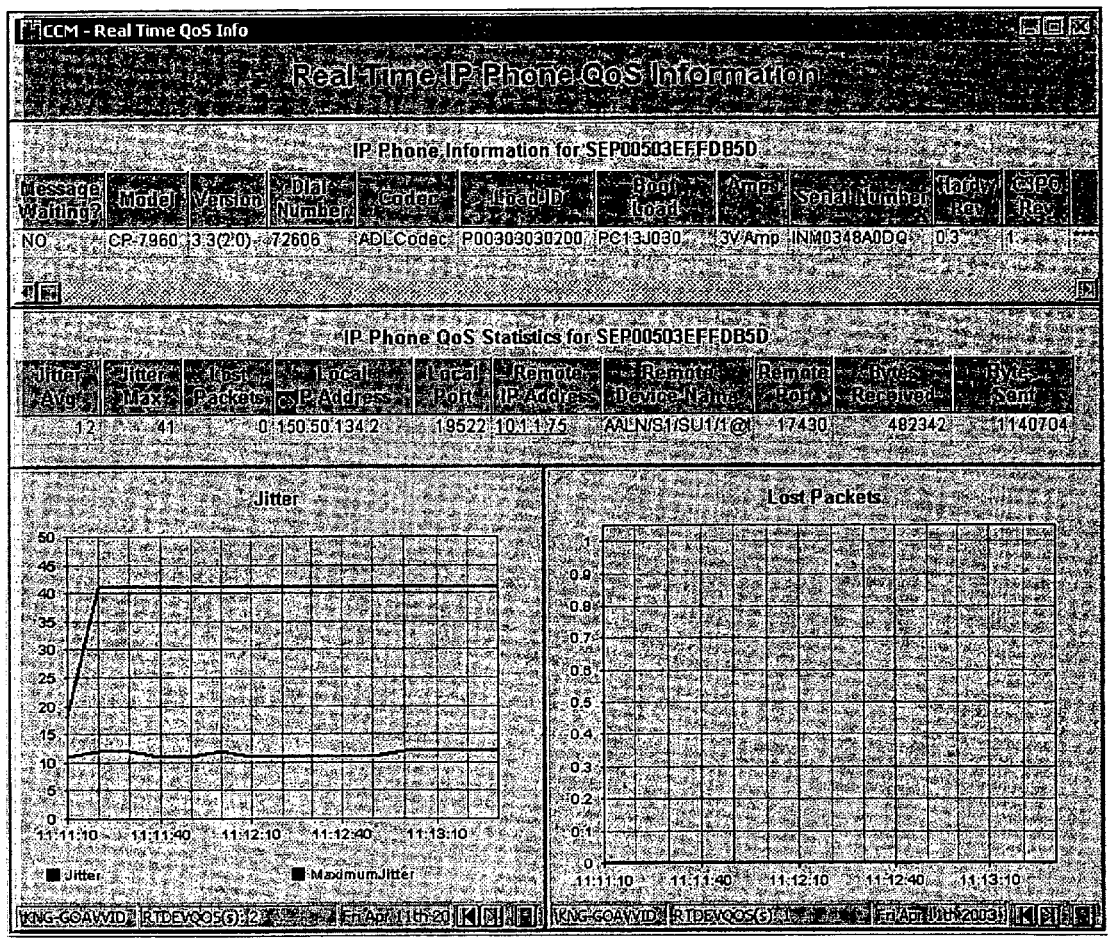
FIG. 7 illustrates quality of service parameters for a particular IP telephone produced by an embodiment of the present invention.

The system configuration information 29 includes details of the rules the system uses for routing calls by the called party number. By combining this information with the entity status information 30 by cross checking, a list of route patterns and their availability is produced. Referring to FIG. 7, the information produced includes:

Route Pattern 70
    Destination Name 72
    Type 74 (MGCP Gateway/MGCP Endpoint/H.323 Gateway/Route List)
    Status 76 (Up/Down)

Figure 8:
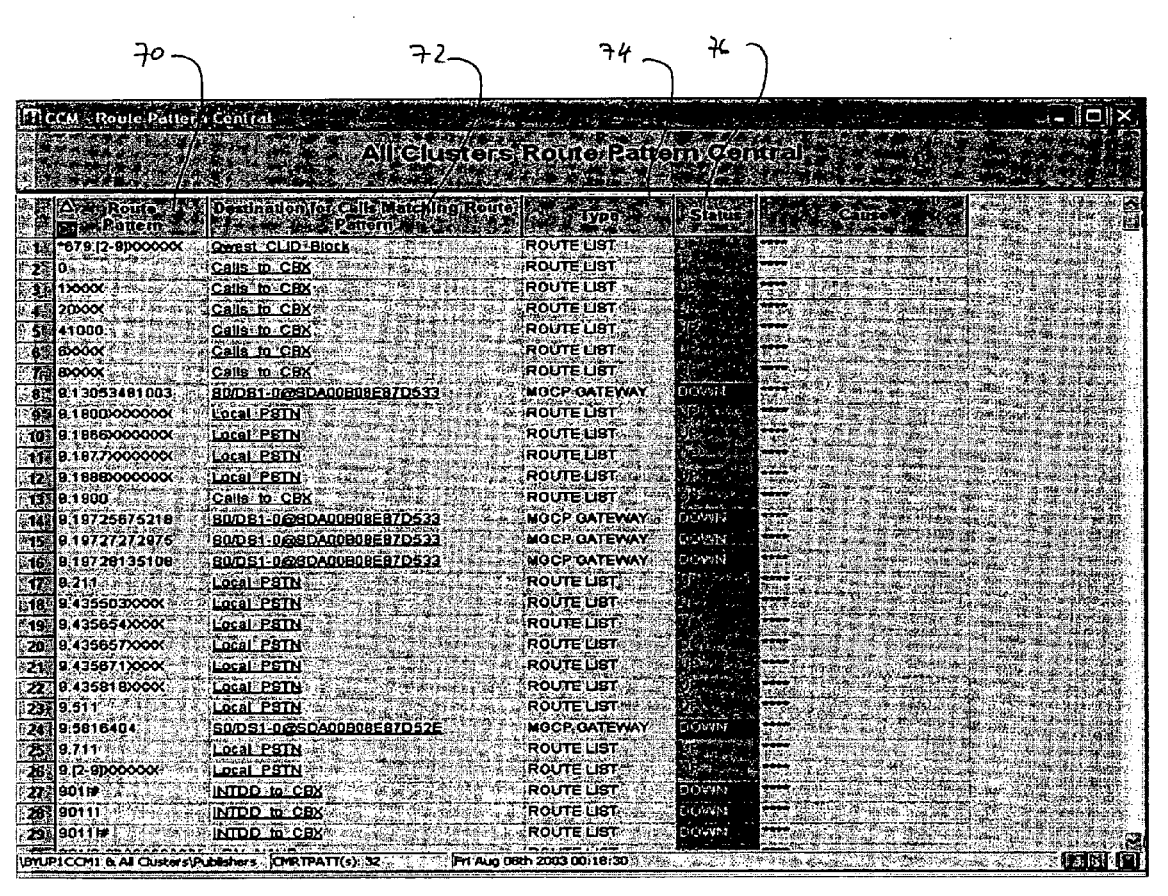

Referring to FIG. 8, a list of endpoints of a gateway are listed.

The operational information output by software program 26 can be presented graphically on a display screen. Alternatively, the system can be configured to send an alert message to a system administrator if a particular element of the operational information crosses a pre-determined threshold. For instance, if call quality drops below a set level the system administrator may be alerted to take action to rectify the situation. Still further, control means may be provided to take action automatically, based on the operational information, to control operation of the system.

The various elements of information may be organised and presented to a user to provide an overview of the system.

Figure 9:
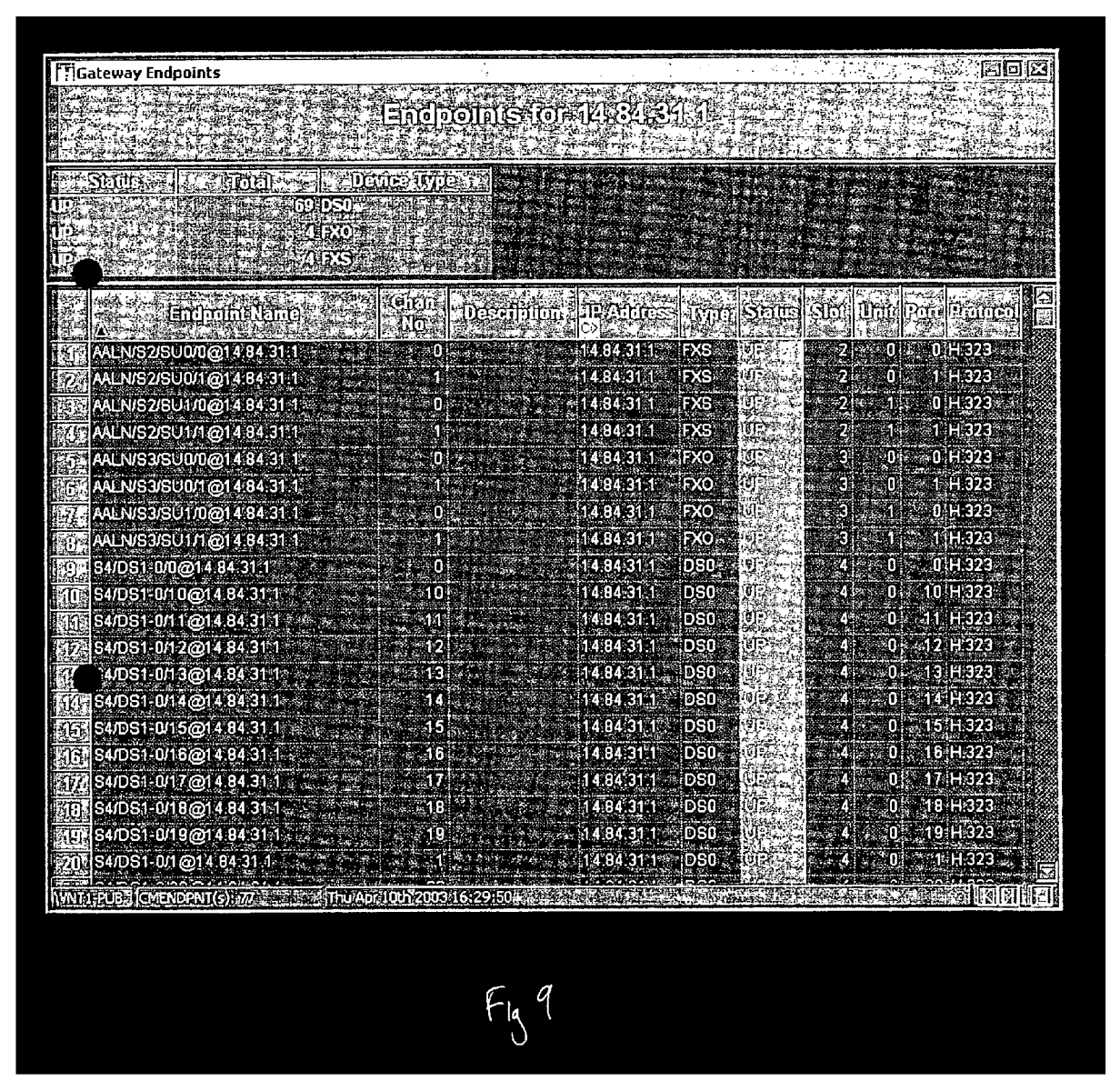
Figure 10:
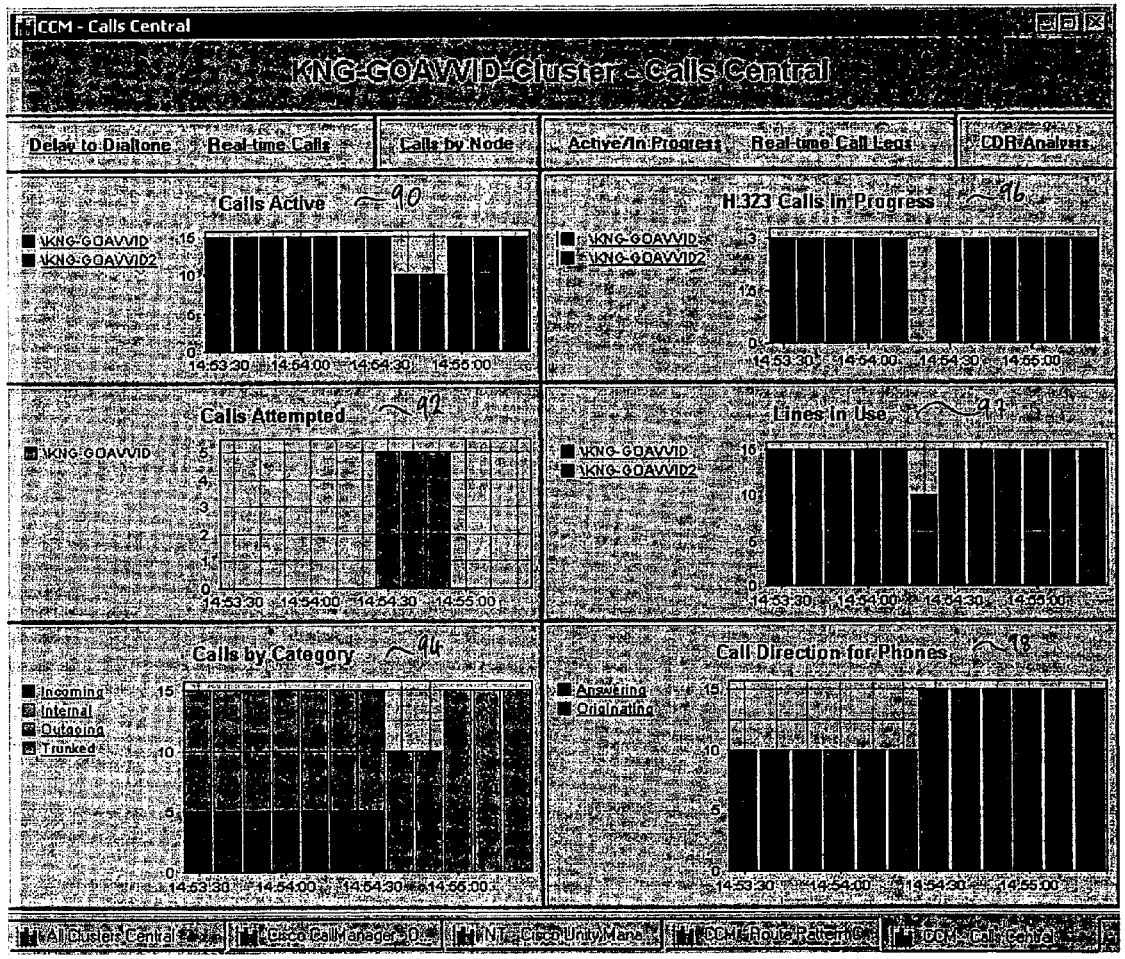
FIGS. 10 and 11 are overviews of operational information regarding an IP telephony cluster produced by an embodiment of the present invention.
Figure 11:
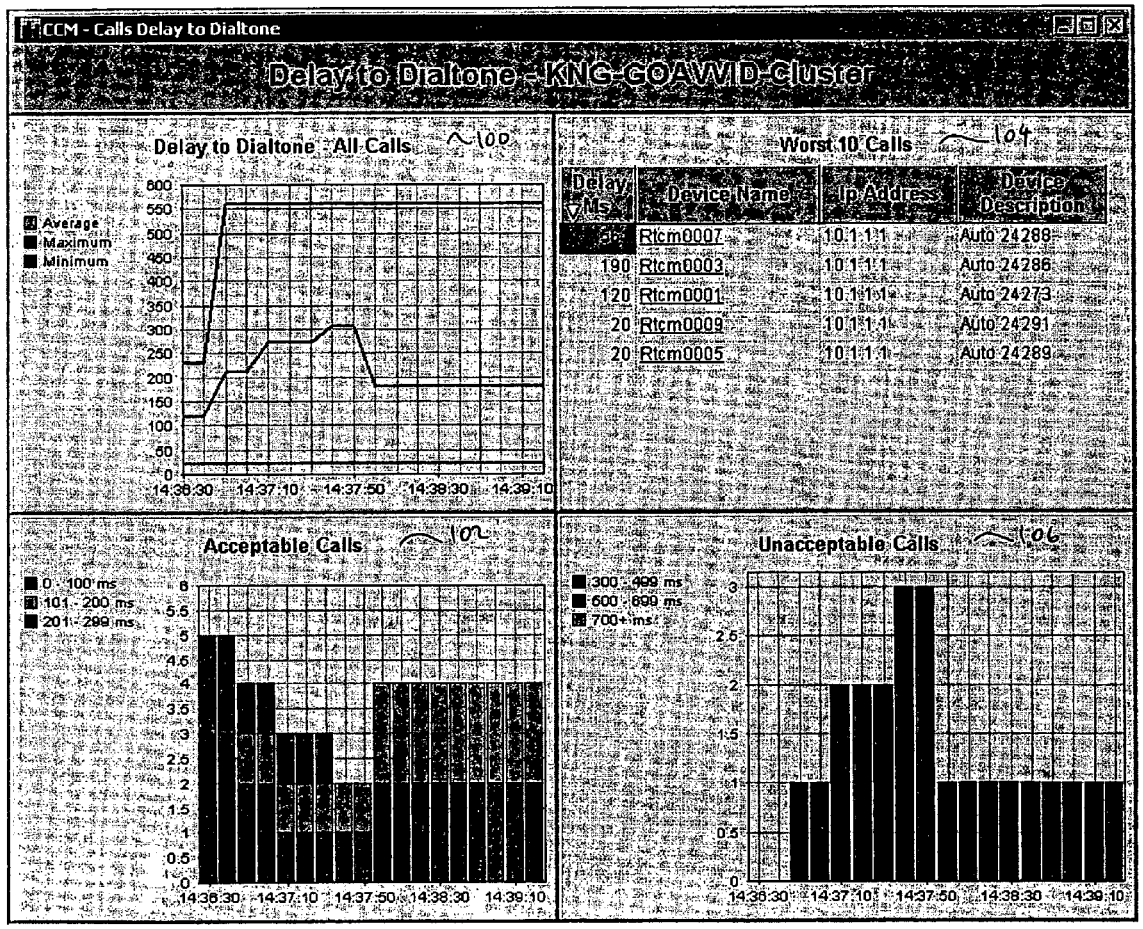

This can serve as a monitoring and diagnostic tool. Referring to FIG. 9, an overview is presented which includes operational information including calls active 90, calls attempted 92, calls by category 94, H.323 calls in progress 96, lines in use 97 and call direction for phones 98. Referring to FIG. 10, an overview is presented which includes operational information including delay to dialtone all calls 100, acceptable calls 102, worst 10 calls 104 and unacceptable calls 106.

The method of the invention is particularly suitable for providing operational information regarding the IP telephony system produced by Cisco Systems and sold under the trade name CallManager.

Whilst this invention has been described by reference to an IP telephony system it has application to other systems where communication between entities is established across a network.

Whilst the software program 26 has been described above as running on its own dedicated networked computer, it could run on a computer that forms part of system controller 20.

Where methods and apparatus of the present invention may be implemented by software applications, or partly implemented by software, then they may take the form of program code stored or available from computer readable media, such as CD-ROMS or any other machine readable media, the program code comprising instructions which, when loaded onto a machine such as a computer, the machine then becomes an apparatus for carrying out the invention. The computer readable media may include transmission media, such as cabling, fibre optics or any other form of transmission media.

It will also be appreciated that, where methods and apparatus of the present invention are implemented by computing systems, or partly implemented by computing systems, then any appropriate computing system architecture may be utilised. This will include stand-alone computers, networked computers, and dedicated computing devices. Where the terms "computing system" and "computing device" are used, then these terms are intended to cover any appropriate arrangement of computer hardware for implementing the function.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

Glossary of Acronyms

E1: A European standard for a digital connection between customer premises equipment and the local exchange. The E1 bit rate is 2.048 Mbit/s.

FXO: Foreign Exchange Office. This is U.S. terminology for the exchange end of an analogue telephone line.

FXS: Foreign Exchange Station. This is U.S. terminology for the subscriber end of an analogue telephone line.

H.323: ITU Standard for packet switched multi-media calls.

IP: Internet Protocol. Part of the TCP/IP protocol suite.

ISDN: Integrated Services Digital Network.

LAN: Local Area Network.

MGCP: Media Gateway Control Protocol.

MIB: Management Information Base. This is an abstract database resident within a managed network node that is accessed via SNMP.

NMD: Network Monitoring Driver.

NMP: Network Monitoring Process.

PRI: Primary Rate ISDN. This is an ISDN connection that is maintained over an E1 or a T1 span.

PSTN: Public Switched Telephone Network.

Q.931: ITU Standard for telephony signalling. This was originally designed for ISDN signalling but has been extended for use in H.323 packet switched calls.

RTP: Real-time Transport Protocol. A protocol used to transmit voice information on a packet switched network.

SCCP: Skinny Client Control Protocol.

SNMP: Simple Network Management Protocol.

T1: A U.S. standard for a digital connection between customer premises equipment and the local exchange. The T1 bit rate is 1.544 Mbit/s.

The invention claimed is:

1. A method of producing operational information regarding the operation of a networked system, the system including entities arranged to communicate over the network, the method including the steps of:

obtaining system configuration information regarding the configuration of the system;

continuously monitoring activity of the system to obtain system activity information; and combining the system configuration information with the system activity information to obtain real time operational information.

2. A method according to claim 1 wherein the system configuration information includes details of the topology of the system.

3. A method according to claim 1 wherein the system configuration information is obtained from a controller of the networked system.

4. A method according to claim 1 wherein the step of monitoring system activity information further includes the step of monitoring network traffic.

5. A method according to claim 4 wherein the network traffic monitored is that addressed to or from a controller of the network.

6. A method according to claim 4 wherein the network traffic is monitored at a node of the network which connects the controller to the network.

7. A method according to claim 1 further including the step of combining entity status information with the system configuration information and the system activity information.

8. A method according to claim 7 wherein the step of obtaining entity status information further includes the step of interrogating an entity connected to the network.

9. A method according to claim 8 wherein the address of the interrogated entity is obtained from the system activity information.

10. A method according to claim 1 wherein the system activity information includes call signalling data.

11. A method according to claim 1 wherein the entities include multi-media devices.

12. A method according to claim 1 wherein the entities include IP telephones or gateways.

13. A method according to claim 1 wherein the operational information produced includes information regarding current calls.

14. A method according to claim 13 wherein the information regarding current calls includes quality of service.

15. A method according to claim 1 wherein the operational information produced includes information regarding current status of entities.

16. A method according to claim 1 wherein the operational information produced includes information regarding route availability.

17. A method according to claim 1 wherein the operational information produced includes the delay to obtaining a dial tone.

18. A method according to claim 1 further including the step of controlling the system based on the operational information.

19. A method according to claim 1 further including the step of graphically presenting an overview of the operational information.

20. An apparatus for producing operational information regarding the operation of a networked system, the system including entities arranged to communicate over the network, the apparatus including:
 obtaining means for obtaining system configuration information regarding the configuration of the system;
 monitoring means for continuously monitoring activity of the system to obtain system activity information; and
 combining means for combining the system configuration information with the system activity information to obtain real time operational information.

21. An apparatus according to claim 20 wherein the system configuration information includes details of the topology of the system.

22. An apparatus according to claim 20 that is arranged to obtain system configuration information from a controller of the networked system.

23. An apparatus according to claim 20 wherein the monitoring means is arranged to obtain system activity information by monitoring network traffic.

24. An apparatus according to claim 23 wherein the monitoring means is arranged to monitor network traffic monitored that is addressed to or from a controller of the networked system.

25. An apparatus according to claim 23 wherein the monitoring means is arranged to monitor network traffic at a node of the network which connects a controller of the networked system to the network.

26. An apparatus according to claim 20 wherein the combining means is further arranged to combine entity status information with the system configuration information and the system activity information.

27. An apparatus according to claim 26 wherein the entity status information is obtained by interrogating an entity connected to the network.

28. An apparatus according to claim 27 wherein the address of the interrogated entity is obtained from the system activity information.

29. An apparatus according to claim 20 wherein the system activity information includes call signalling data.

30. An apparatus according to claim 20 wherein the entities include multi-media devices.

31. An apparatus according to claim 1 wherein the entities include IP telephones or gateways.

32. An apparatus according to claim 20 wherein the operational information produced includes information regarding current calls.

33. An apparatus according to claim 32 wherein the information regarding current calls includes quality of service.

34. An apparatus according to claim 20 wherein the operational information produced includes information regarding current status of devices.

35. An apparatus according to claim 20 wherein the operational information produced includes information regarding route availability.

36. An apparatus according to claim 20 wherein the operational information produced includes the delay to obtaining a dial tone.

37. An apparatus according to claim 20 further including control means for controlling the system based on the operational information.

38. An apparatus according to claim 20 further including presentation means for presenting an overview of the operational information.

* * * * *